Aug. 13, 1935.    W. H. SCHULZ    2,011,303
AIR CLEANER SCREEN
Filed May 14, 1934    3 Sheets-Sheet 1

INVENTOR
William H. Schulz
By His Attorneys

Aug. 13, 1935.   W. H. SCHULZ   2,011,303
AIR CLEANER SCREEN
Filed May 14, 1934   3 Sheets-Sheet 3

INVENTOR
William H. Schulz
By His Attorneys

Patented Aug. 13, 1935

2,011,303

UNITED STATES PATENT OFFICE 2,011,303

AIR CLEANER SCREEN

William H. Schulz, Minneapolis, Minn., assignor to Donaldson Company, Inc., St. Paul, Minn., a corporation of Minnesota Application May 14, 1934, Serial No. 725,515

4 Claims. (Cl. 183—15)

My present invention relates to air cleaners for internal combustion engines and the like, and provides an improved screen.

Generally stated, the invention consists of the novel devices, and combinations of devices, arrangement of parts hereinafter described and defined in the claims.

In the accompanying drawings, the improved screen is shown as applied in an air cleaner of the type disclosed and claimed in pending application, S. N. 702,482, filed December 15, 1933, by Wilfred W. Lowther, as inventor, but the screen is applicable to air cleaners of other types. The screen as a product, will appear in the description of the accompanying drawings wherein like characters indicate like parts throughout the several views.

Referring to the drawings:

Fig. 3 is a plan view showing the screen after it has been corrugated and the ends thereof connected to form a drum-like or cylindrical annular structure;

Figure 1:
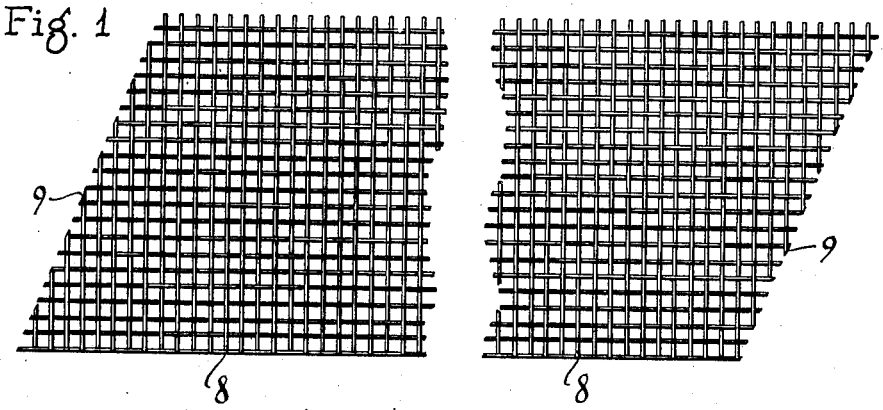
Fig. 1 is a plan view with some parts broken away showing a ribbon-like screen section from which a screen element is to be formed.
Figure 2:
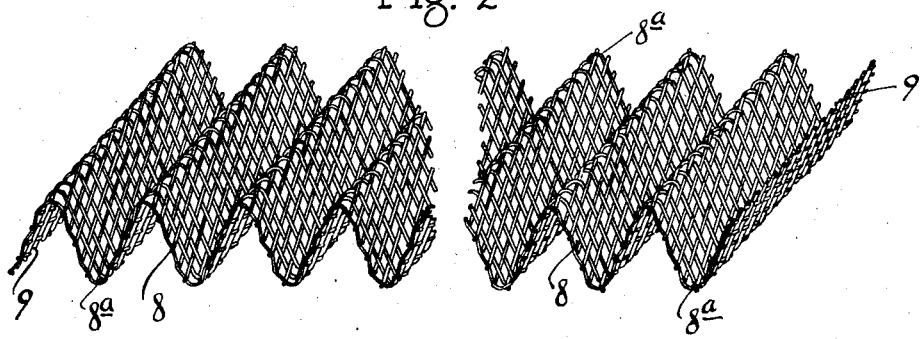
Fig. 2 is a perspective showing the screen section as it appears after it has been initially corrugated.
Figure 4:
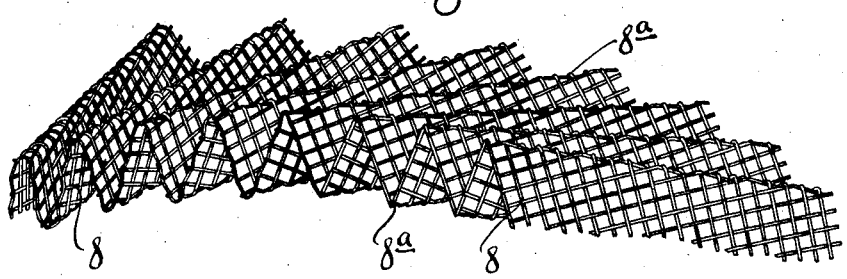
Fig. 4 is a perspective showing a section of the screen as it appears after it has been flattened out to form a flat annular corrugated structure.

The screen element is formed from a primarily flat wire screen ribbon 8, the ends of which are preferably obliquely cut at 9. This screen ribbon is, preferably by suitable corrugating rollers, bent to form the same with a plurality of parallel transversely oblique corrugations 8a. These corrugations 8a are preferably parallel to the oblique ends 9. After the corrugated screen has been formed as shown in Fig. 2, the ends thereof are brought together and rigidly connected by solder or spot welding so that there will be formed a drum-like or approximately cylindrical annular corrugated structure as shown in Fig. 3. In Fig. 3, the oblique portions of the screen are shown in full only in part but it will be understood that that oblique formation will be continued completely around the structure.

Figure 5:
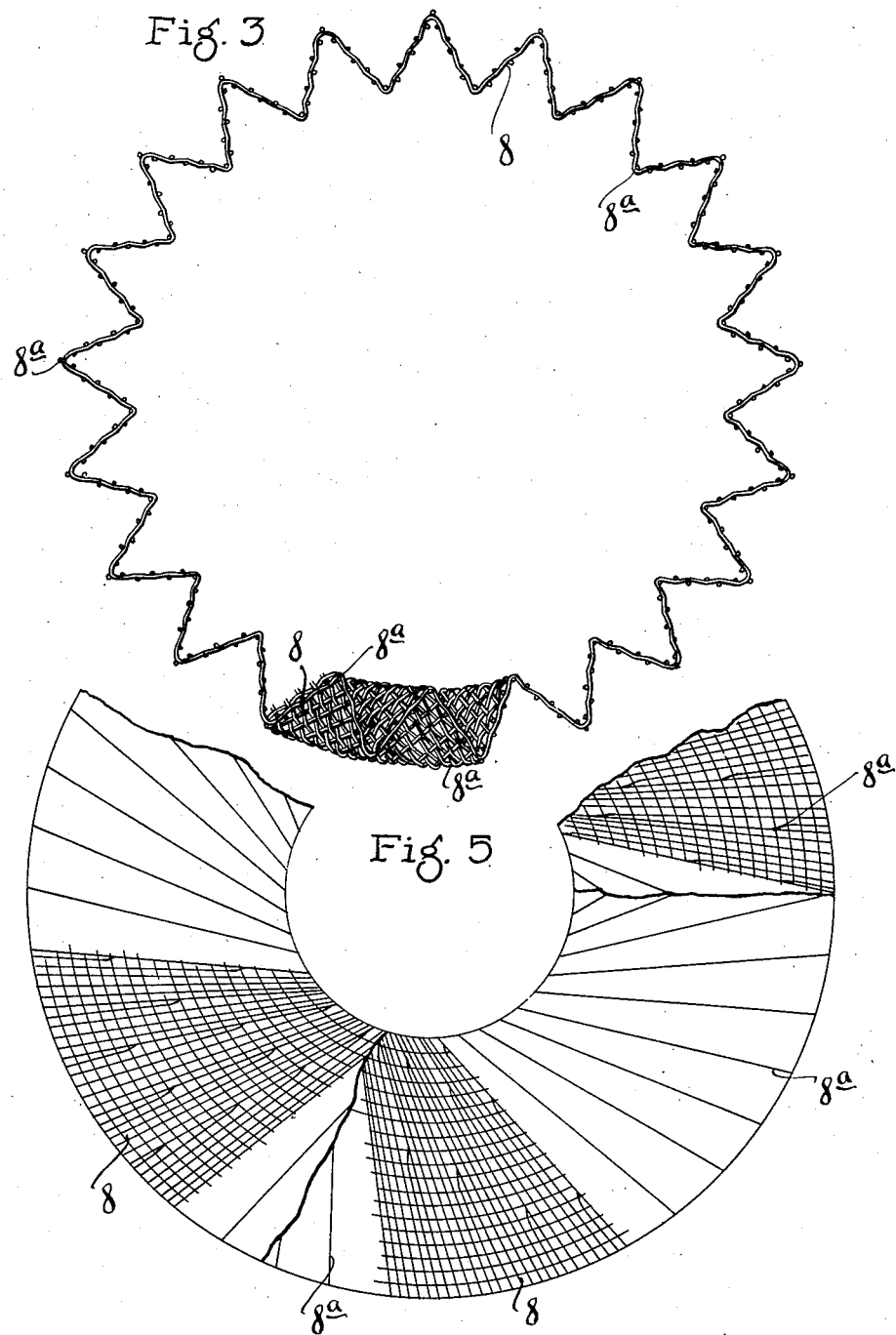
Fig. 5 is a plan view with parts broken away showing two of the flat annular screen elements placed together with their corrugations in reverse oblique arrangement.

After the screen has been formed as shown in Fig. 3, it will be turned into a common plane or to form a flat annular structure. This turning inward of one edge of the structure shown in Fig. 3 to form the structure shown in Figs. 5 and 7, will contract the inner corrugated edge so that the corrugations will decrease in circumferential spacing and increase in depth in a direction from the perimeter toward the inner edge of the flat annular corrugated element.

It is important to note that the corrugations of the screen are not only transversely oblique to the edges of the screen when bent as shown in Fig. 2, but in the completed screen element will be oblique to radii projected from the axis or center of the screen. Otherwise stated, in the completed element, the corrugations are tangential to an imaginary circle struck from the axis of the screen and which imaginary circle is not greater but somewhat less than the diameter of the inner edge of the screen. This oblique extension of the corrugations not only facilitates the bending of the screen structure into the flat annular formation but provides an arrangement in which, when several of the said elements are placed one on top of the other in alternately reversed positions, the corrugations of the adjacent screens will contact on transversely intersecting lines so as to prevent nesting of the screens even when the screens are made exact duplicates.

Figure 6:
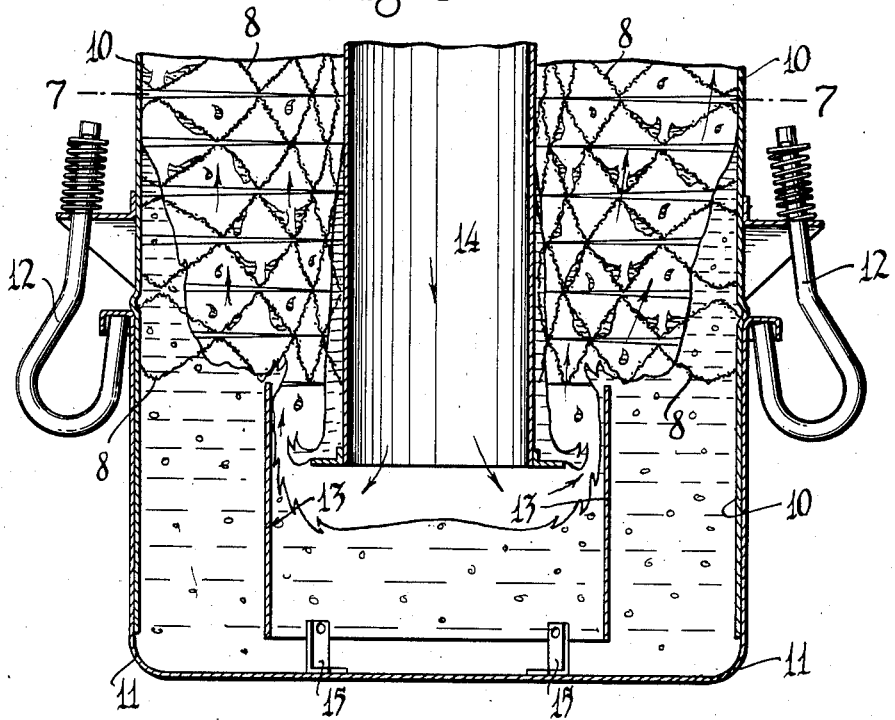
Fig. 6 is a vertical axial section taken on the line 6—6 of Fig. 7; and showing a stack or plurality of screen elements placed within an air cleaner of the type shown in the said Lowther application above identified, upper portions of the air cleaner being broken away.
Figure 7:
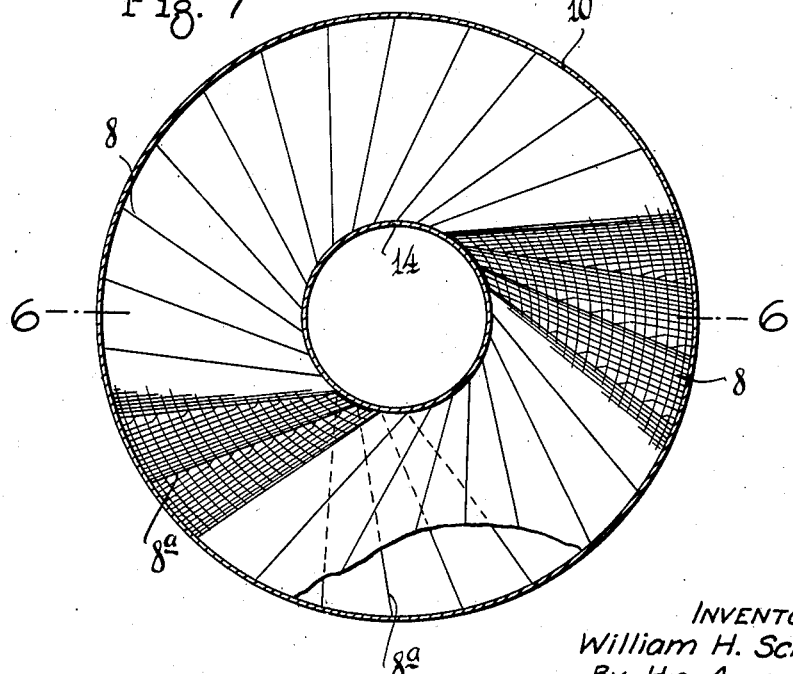
Fig. 7 is a horizontal section taken on the line 7—7 of Fig. 6.

In Figs. 6 and 7, a stack or multiplicity of the said screens, formed as described, are placed within the shell of the air cleaner. Describing the same as applied to an air cleaner of the above identified Lowther type, the numeral 10 indicates the outer cylindrical casing, the lower end of which is primarily open; the numeral 11 indicates an oil well telescoped onto the lower end of the casing 10 and detachably held thereto by spring-pressed hooks 12. The numeral 13 indicates an annular baffle that surrounds the lower end of an axial air intake tube 14 and is shown as held in place by brackets 15.

The operation of the air cleaner with oil intercepting screens is very fully set forth in the prior Lowther application above identified. For the purposes of this case, it is sufficient to state that when the upper portion, not shown, of the casing 10 is connected to an internal combustion engine, the air will be drawn down through the axial air intake tube 13, will be dashed against the oil contained within the well 11 and will be carried with the oil upward into and through certain of the screens, and that the oil will be intercepted by the screens and caused to run back into the well, while the clean air will be drawn onward to the engine. The screen elements of this application have been found to be of especially high efficiency for the purposes had in view, and moreover, they may be made at comparatively small cost and assembled in the most satisfactory manner.

Advisably the screen will be corrugated before the ends thereof have been connected to form an endless drum-like or cylindrical band, but it would be possible to corrugate them after their ends have been united but before the screen has been turned to a flat annular formation.

A screen such as produced by this process can best and most economically be produced by the method or process described, nevertheless, the completed screen, to wit: a corrugated flat annular screen element of the character above described, is thought to be broadly new and it is herein claimed as such.

Tests made with air cleaners in which these improved screen elements have been incorporated have shown very high efficiency. This efficiency is due largely to the condensed formation of the inner corrugated portion of the screens. In the operation of the air cleaner such as illustrated in the drawings, for example, the strongest upward current of air and the greatest amount of oil carried by the air will be closely adjacent to the air intake tube 14 and that high velocity air and oil will be carried through the inner portions of the screens or, in other words, through those portions of the screens that have the greatest depth and the most closely spaced corrugations. Otherwise stated, the amount of screen surface condensed in the smaller diameter of the annular screen is equal to that incorporated in the extreme outermost portion of the screen. The condensed portions of the screen, of course, have a greater oil-intercepting action than do the outermost portions of the screens, through which outer portions, air of less velocity will pass. The screens described, therefore, have highly desirable features both from point of efficiency in action and facility of production.

What I claim is:

1. A screen element of flat disc-like formation having transverse corrugations that increase in depth and decrease in circumferential spacing in a direction from the perimeter toward the axis of said screen.

2. A screen element of flat annular formation having transverse corrugations that increase in depth and decrease in circumferential spacing in a direction from the perimeter toward the inner edge of said screen, and which corrugations are oblique to radii projected from the axis of the screen.

3. In an air cleaner, a plurality of screens of the character described in claim 2, in which the screens are assembled in alternately reversed order so that the corrugations thereof contact on intersecting lines.

4. In an air cleaner, a plurality of disc-like screens having corrugations that are oblique to lines radiating from the axes thereof, said screens being assembled in alternately reverse order so that the corrugations thereof extend on intersecting lines.

WILLIAM H. SCHULZ.